Sept. 28, 1943.   C. B. MOORE   2,330,606
INTEGRATING MECHANISM
Filed Jan. 4, 1940   2 Sheets-Sheet 1

INVENTOR
COLEMAN B. MOORE
BY
ATTORNEY

Sept. 28, 1943.    C. B. MOORE    2,330,606
INTEGRATING MECHANISM
Filed Jan. 4, 1940    2 Sheets-Sheet 2

INVENTOR
COLEMAN B. MOORE
BY *George M. Mulvaney*
ATTORNEY

Patented Sept. 28, 1943

2,330,606

UNITED STATES PATENT OFFICE 2,330,606

INTEGRATING MECHANISM

Coleman B. Moore, Carroll Park, Pa., assignor to The Brown Instrument Company, Philadelphia, Pa., a corporation of Pennsylvania Application January 4, 1940, Serial No. 312,384

4 Claims. (Cl. 235—61)

The general object of the present invention is to provide a highly accurate counting mechanism that is designed primarily for use as an integrator in flow meters. The counting mechanism may, however, be used for other purposes in which a counting mechanism of high accuracy is desirable.

While the general features of the present invention are adapted for other uses, the invention was primarily devised for use in a flow meter instrument including integrating and recording means, and of the type in which the instrument includes an inductance bridge receiver element connected by electrical conductors to the transmitter element of said bridge, said transmitter element being external to the instrument and associated with the manometer of a flow meter in a known manner. In such an arrangement, variations in the fluid flow rate measured, act through the manometer, to give movements to the movable magnetic core or armature of the transmitter, and such movements produce, by electro-magnetic action, corresponding movements of the movable core or armature of the receiver element of the bridge, the last mentioned armature forming the movable measuring member of the instrument proper.

In the preferred embodiment of the invention illustrated herein by way of example, a segmental lever is periodically moved from a predetermined zero position to a position determined by the value of the flow that is being measured. Each of these movements is added by a counter mechanism to totalize the flow for a given period of time.

The various features of novelty which characterize my invention are pointed out with particularity in the claims annexed to, and forming a part of this specification. For a better understanding of the invention, however, its advantages, and specific objects attained with its use, reference should be had to the accompanying drawings and descriptive matter in which I have illustrated and described a preferred embodiment of the invention.

Figure 1:
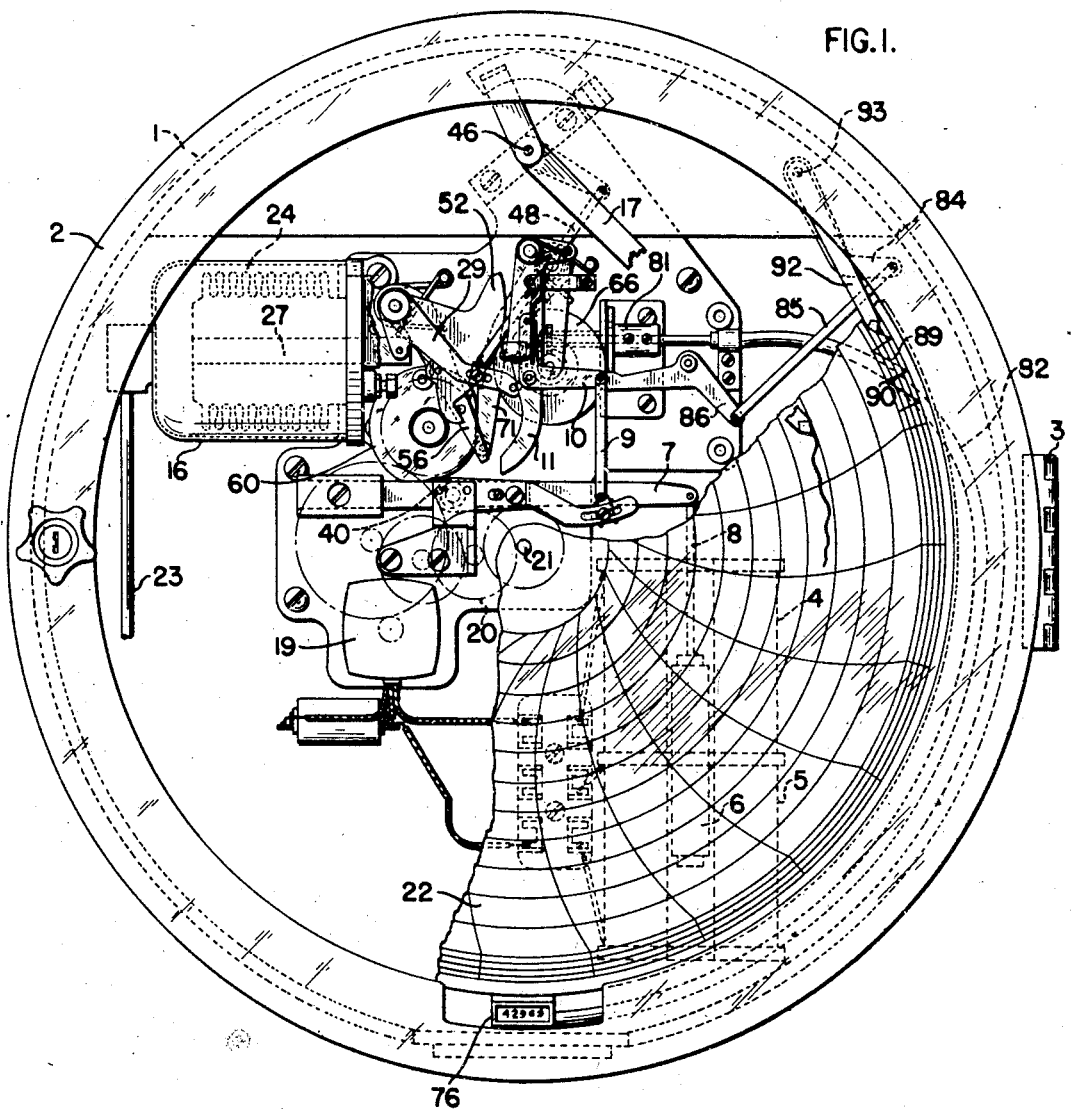
Fig. 1 is a front view of an instrument embodying my invention.

The instrument shown in the drawings is of the circular chart type, the instrument mechanism being enclosed in a casing or housing, which may be in the form of a short cylinder 1 provided with a front door 2 connected to the casing body by a hinge 3. The mechanism within the instrument includes an inductance bridge receiver element, comprising vertically disposed coils 4 and 5, arranged end to end, and an armature 6 axially movable in the coils 4 and 5. The receiving element of the instrument may be similar in type and in its inductance bridge association with the manometer actuated transmitter element of the bridge, with the arrangement disclosed in the Harrison Patent 1,743,852, granted January 14, 1930, and hence need not be illustrated or described herein.

Figure 3:
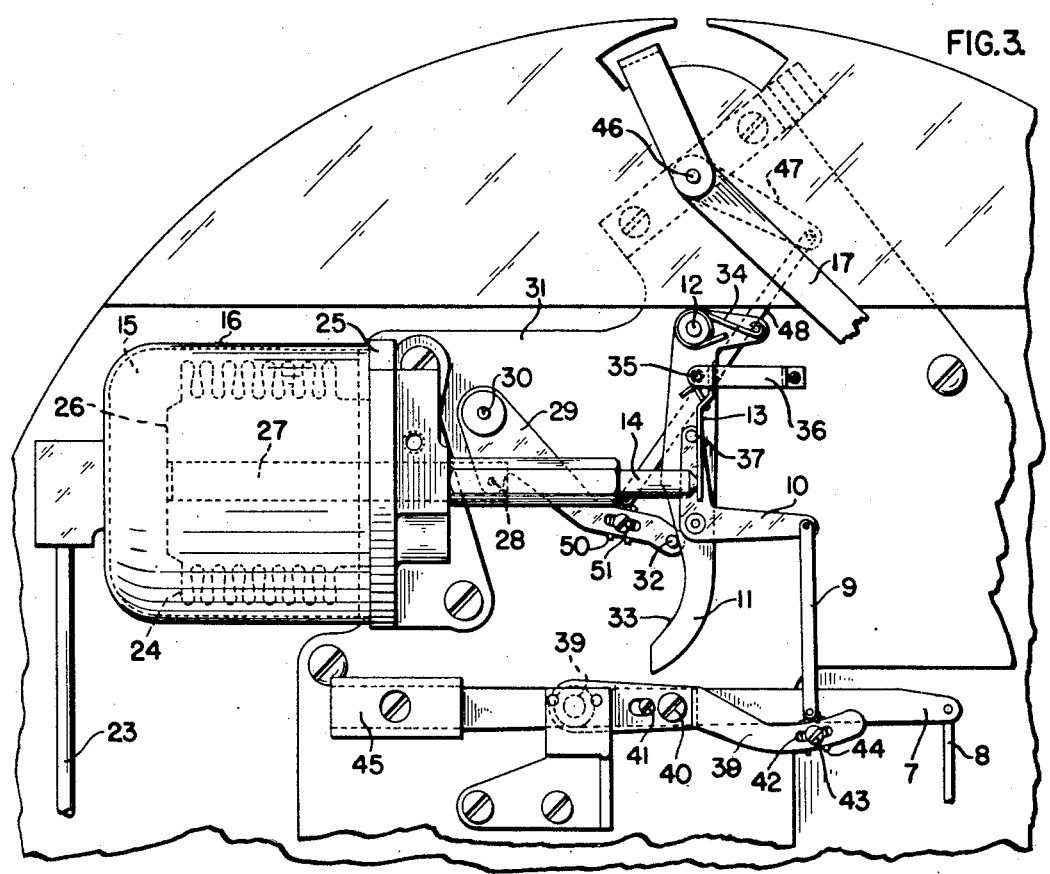
Fig. 3 is a view of portions of Fig. 1 taken on a larger scale.

In the construction shown, the armature 6 is suspended from a lever 7, to which the upper end of a stem or link extension 8 from the armature 6 is pivotally connected. The angular movements imparted to the lever 7 by the armature 8, are transmitted through a link 9 to a lever 10. The latter is pivoted on a lever 11 which is journalled on a supporting pivot 12. The angular movements of the levers 10 and 11, effected as hereinafter described control the adjustment of a flapper valve 13 (Fig. 3), which regulates the discharge of air through the discharge or bleeder outlet nozzle 14, from the pressure chamber 15 of a bellows unit or fluid pressure device 16, and thereby regulates the pressure in the chamber 15 and the operative effect of the device 16. As hereinafter described, the device 16 adjusts a recording pen arm 17 and controls the action of an integrating mechanism 18 which forms the subject matter of this invention. An electric motor 19, provides a timing function, in that through speed reducing gears 20, it rotates the driving element 21 which rotates the chart disc 22 on which the pen arm 17 makes a record. Air under suitable pressure is supplied to the pressure chamber 15 of the device 16 through a pipe 23. Air is bled or vented from the chamber 15 through the nozzle 14, at a rate determined by the adjustment of the flapper valve 13, and so as to maintain the pressure in the chamber 15 required for the operative functions of the device 16.

The pressure chamber 15 of the unit or device 16, has a movable wall, formed by a bellows element 24 within the cup shaped body of the unit. The bellows 24 is connected at one end to the annular head 25 attached to the rim of said cup shaped body. The other end of the bellows 24 is closed by an end wall 26, which is movable. A rod or stem 27 within, and extending longitudinally of the bellows, has one end secured to the movable bellows end wall 26, and is pivotally connected at its other end by a pivot 28 to a bell crank lever 29 pivoted on a shaft 30. The latter extends transversely to the bellows axis, and is journalled on a supporting plate 31 to which end member 25 is attached. The second crank arm of bell crank 29 carries a pin 32 engaging an edge portion 33 of the lever 11.

The lever 11 is biased for movement in the clockwise direction, by a spring 34, so that the edge 33 of the lever is maintained constantly in engagement with the pin 32. The flapper valve 13 is pivoted at 35 on a bracket 36 attached to plate 31, and is spring biased for movement in the clockwise direction toward the end of the nozzle 14, so that, left to itself, the flapper valve 13 tends to close the nozzle 14, and thereby increase the pressure in the chamber 15. The flapper valve 13 is adjusted toward and away from the nozzle 14, by a pin, or projection 37 from the lever 10. The pin 37 may be moved to adjust the valve 13 either by an angular movement of the lever 10, or angular adjustments of the lever 11 effected through the pin 32 by the contraction and expansion of the bellows 24, resulting from an increase or decrease of the pressure in the chamber 15.

The net operating effect of the described mechanism for adjusting the flapper valve 13, is to vary the pressure in the chamber 15 as required to make the angular position of the crank shaft 29 dependent in a predetermined manner on the axial adjustment position of the armature 6 relative to the coils 4 and 5. On an increase in the fluid flow, which, with the arrangement shown, produces an upward movement of the armature 6, the direct effect of the armature movement is to give counter-clockwise adjustments to the levers 7 and 10. The resultant counter-clockwise movement of the pin 37 permits a movement of the flapper valve 13 toward the nozzle 14, whereby the pressure in the chamber 15 is increased. That increase of pressure moves the bellows end 26 to the right, and, through the stem 27 and pivot pin 28, gives a counterclockwise adjustment to the bell crank 29, whereby the pin 32 acting on the lever 11 gives a counter-clockwise adjustment to the latter. The resultant bodily movement to the right of the lever 10, causes the flapper valve to move away from the nozzle 14, as required for the maintenance of a pressure in the chamber 15 just sufficient to prevent further movement in either direction of the bellows end 26 and stem 27.

Conversely, on a decrease in the rate of flow measured, and a corresponding down movement of the armature 6, the resultant clockwise adjustment of the lever 10, moves the flapper valve 13 away from the nozzle 14, and reduces the pressure in the chamber 15. This results in a movement of the bellows end 26 and stem 27 to the left. Those movements are terminated as soon as the resultant clockwise adjustments of the bell crank 29, pin 32, and lever 11, permits a closing movement of the flapper valve 13 into the position required for the maintenance of the pressure in the chamber 15 necessary to arrest the expansion of the bellows 24.

To properly relate the positions and relative movements of the bellcrank lever 10 and armature 6, the lever 7, comprises in addition to the arm to which the stem 8 is directly pivoted, a second arm 38, also journalled on the pivot pin 39 and adjustably clamped to the first mentioned arm by a clamping screw 40. An adjusting screw mounted in the part 7 and having an eccentric head projection 41 received in a slot in the first mentioned arm of the lever 7, serves by its rotation when the clamping screw 40 is released, to angularly adjust the arm 38 relative to the lever part to which the stem 8 is directly connected. The lever part 38 is formed with a slot 42 curved about the axis of the pivotal connection between the lever 10 and link 9. The slot 42 receives a clamping screw 43 by which a part 44, adjustable along the slot 42, may be clamped to the lever part 38. The lower end of the link 9 is pivotally connected to the part 44. The lever 7 carries an adjustable counterweight 45 by which the lever with its connections is gravitationally balanced.

The pen arm 17 which records the rate of flow on the record disc 22 is turned about the axis of a pivot 46 by an arm 47 rigidly connected to the pen arm and connected by a link 48 to the crank arm 29. As shown, the connection between the link 48 and crank 29 is made adjustable to vary the leverage with which the crank arm acts on the pen arm. The adjustment provisions comprise a part 50 adjustably secured to the arm 29 by a clamping screw 51 passing through an elongated slot in the arm 29. The lower end of the link 48 is pivoted to the part 50.

In various instruments in which the present invention may be used with advantage, the movements of the movable measuring member are not in linear proportion to the changes in value of the quantity measured. Thus, in the flow meter illustrated and described, the movements of the receiver core 6 are proportional to the square root of the rate of flow measured. In general, it is preferable, and in some cases highly desirable from the practical standpoint, that the exhibiting element of the instrument, whether it be a recording pen or an indicating pointer, should move in linear proportion to the changes in the quantity measured. Such linear movement of the pen arm 17 of the instrument illustrated, is readily obtained by suitably shaping the edge 33 of the lever 11 engaged by the pin 32.

It is desirable that the pressure in chamber 15 is not permitted to fall below the value necessary to maintain the pen at zero or above the value necessary to maintain the pen at full scale notwithstanding deflection of lever 7 below its position corresponding to zero position of pen 17 or above its position corresponding to full scale position of pen 17. To this end the upper and lower ends of the surface 33 of lever 11 are shaped as shown. As member 29 is deflected clockwise beyond the point at which pen 17 coincides with its zero scale position as a result of a decrease in pressure in chamber 15, member 11 will be permitted to move clockwise to neutralize said pressure and maintain the pen substantially at zero. As member 29 is deflected counter-clockwise beyond the point at which pen 17 coincides with its full scale position, member 11 will be turned counter-clockwise to minimize such movement.

The integrating mechanism with which this invention is more particularly concerned derives its counting movements from the oscillations of a segment shaped driving member 52 (Fig. 2) that is pivoted on the shaft 30 which carries the bellcrank lever 29. This member has a driving edge 53 provided with a projection 54 at its lower end that is adapted to be engaged by a pin 55 on a lever 56 that is also pivoted on the shaft 30. The segment 52 is normally biased by a spring 57 in a counter-clockwise direction so that projection 54 is in engagement with pin 55. The lever 56 is in turn biased in a clockwise direction by a spring 58, stronger than spring 57, into engagement with a roller 59 on a cam 60. This cam is driven at a suitable speed from motor 19 to give suitable movements to the lever 56.

Figure 2:
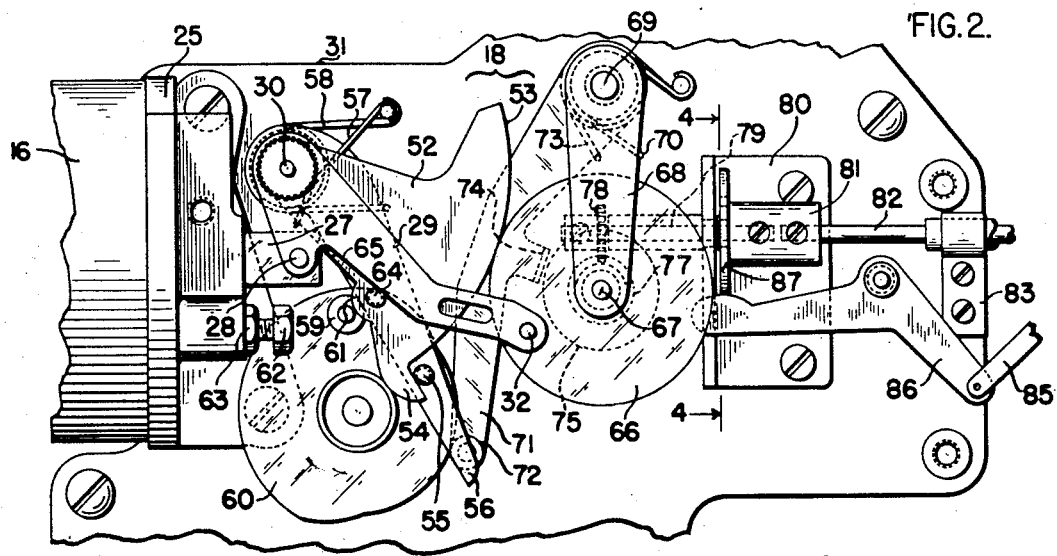
Fig. 2 is a view of the integrator mechanism.

The ram 60, rotating in a counter-clockwise direction from the position shown in Fig. 2, permits lever 56 to move under the influence of spring 58 until a projection 61 on the segment member 52 engages an adjustable stop 62 in the form of the head of a screw in the annular head 25. This stop is held in its adjusted position by a lock nut 63. As the roller 59 of cam 60 starts upward and to the right it will engage the lower edge of lever 56 to move that lever counter-clockwise against the bias of spring 58. The member 52 will move along with lever 56 under the bias of spring 57 until a projection 64 on that member engages the edge 65 of bell crank 29. Lever 56 will continue to travel upward to a point determined by roller 59. This point is slightly higher than the segment 52 would go if the bellows 24 had moved bellcrank 29 to full scale position.

From the above it will be seen that the segment 52 moves between limits determined by engagement between its projection 61 and stop 62 and between its projection 64 and edge 65 of the lever 29. The first limit is determined by adjusting stop member 62 so that when there is zero flow 61 and 62 will be in engagement and 64 and 65 will be in engagement so that there is no movement of segment 52. The second limit, as above described will be determined by the position of lever 29, or will be proportional to the flow being measured at that instant.

The clockwise movement of segment 52 is used to actuate a counter by imparting its motion to a disc 66 that is rotatable on a shaft 67. The shaft 67 is mounted on a lever 68 that is pivoted on shaft 69 and biased in a clockwise direction by a spring 70, to bring the periphery of disc 66 into frictional engagement with the driving edge 53 of segment member 52. Also pivoted on shaft 69 is a lever 71 having a cam following roller 72 on its lower end engaging the periphery of cam 60. This lever is also biased in a clockwise direction by a spring 73. The periphery of cam 60 is so shaped with respect to the angular position of roller 59 that the low portion of the cam will come under roller 72 as roller 59 reaches a position in which lever 56 begins to move clockwise. This permits spring 70 to move disc 66 into engagement with edge 53 just prior to the time that segment 52 starts to move clockwise. When segment 52 has finished its clockwise movement the high portion of cam 60 will come under roller 72 to move lever 71 counter-clockwise. The disc 66 is thereby moved away from edge 53 by means of engagement between a brake member 74 on the lever 71 and a brake disc 75 also attached to the shaft 67. The rocking movement of the support 68 of disc 66 is only large enough to permit a clearance between disc 66 and edge 53 as the latter moves counter-clockwise and is therefore too small to have any effect upon the gearing that is now to be described.

Rotation of the disc 66 is imparted to a counter 76, located in the bottom of the casing 2, by means of a worm gear 77 on the shaft 67. This gear drives a worm wheel 78 attached to the end of a shaft 79 journalled in a bracket 80 attached to the supporting plate 31. A connecting member 81 connects the shaft 79 with a flexible shaft 82 extending around the edge of the casing to the counter 76. A clip 83 acts to help support the shaft 82.

The operation of the integrator will be apparent from the above description. A short summary will, however, now be given. As the segment 52 is moved counter-clockwise to a position depending upon the position of lever 29 the disc 66 will be held out of engagement therewith and prevented from rotating by engagement between brake 74 and brake wheel 75. Cam 60 will then permit the disc 66 to move against edge 53 and segment 52 will then be rotated clockwise by lever 56 and spring 58 until projection 61 engages stop 62. This motion rotates the disc 66 and, through the gearing 77, 78 and shafts 79 and 82, actuates the counter 76 an amount proportional to the flow as measured by lever 59.

The speed at which cam 60 is driven may be selected in accordance with the type of service for which the flow meter is to be used. The periodic motion of segment 52 serves to add the successive measurements of the position of lever 29 in a simple and positive manner. Slipping between edge 53 and disc 66 may be entirely obviated with a resultant increase in accuracy of the instrument by making the force of spring 70 sufficient to prevent such slipping and by making the disc 66 from some suitable material, or by corrugating the edge thereof.

Figure 4:
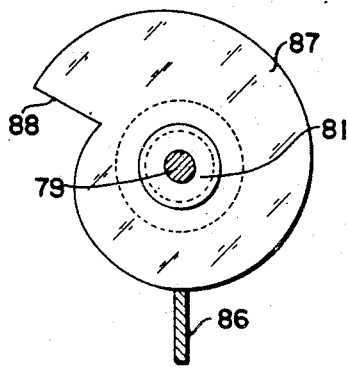
Fig. 4 is a view taken on line 4—4 of Fig. 2.

In an instrument of the type illustrated, it is convenient, in many cases, to provide a record on the record chart 22 of the integrated values of the quantity measured during different periods throughout the periods in which any particular record chart 22 is in use, such as might be obtained by moving a planimeter along the record curve traced on the chart by the pen arm 17. In the instrument shown, a record of the integrated value of the flow, is made on the chart disc 22 adjacent its periphery, as shown in Fig. 1, by a pen arm 92 pivoted at 93 and connected by a crank arm 84 and link 85 to a lever 86, which is operatively engaged by the edge of a cam 87 carried by the connecting member 81. The cam 87 (Fig. 4) is shown as having a spiral edge with its minimum and maximum radial portions connected by a radial shoulder 88. In consequence, the record formed by the pen arm 92, will consist of a plurality of inclined portions 89, each connected to each adjacent portion by a transverse portion 90. The angular displacement between adjacent transverse curve portions 90 will correspond to the time interval required for the chart movement during which the integrated value of the flow is that represented by a single revolution of the shaft 79. Each curve portion is a short arc, the radius of curvature of which is equal to the length of the pen arm, and each inclined portion 89 will approximate or depart from a straight line, accordingly, as the rate of flow is approximately constant or varies during the period in which said inclined portion is formed.

As is well known to those skilled in the art, instruments in which the movable measuring member is the core of an induction bridge receiver element, are not restricted to use in measuring rates of flow, but is well adapted for use where the core of the transmitter element of the bridge is moved by changes in temperature or liquid level or pressure or of other physical quantities or conditions.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a measuring instrument a shaft, a lever pivoted on said shaft and biased in one direction, a support also pivoted on said shaft and biased in the same direction, connected members rotatable on said support about an axis parallel to that of said shaft, one being in the path of movement of said lever and engaged thereby, means to periodically move said lever into and out of engagement with the member engaged thereby and thereby move said members against said bias, and means to rotate said members various amounts while they are at one end of their movement, and said one member is out of engagement with said lever.

2. In a measuring instrument, the combination of a counter operating mechanism including a lever having a curved driving edge, means to move said lever in opposite directions through a path of a length proportional to the value of a measurable condition, one end of said path being fixed, a driven member having a curved driven edge adapted to be rotated by engagement with said curved driving edge, a swinging support for said driven member, and means to move said support radially of said edges to bring said curved driven edge into or out of driving engagement with said curved driving edge, said former edge engaging said latter edge upon movement thereof in only one direction through said path, said means to move said support including a brake means operative upon movement of said driven means out of engagement with said curved driving edge to restrain said driven means from movement.

3. In a measuring instrument, the combination of a counter actuating mechanism including an element having a curved driving edge, means to move said element in opposite directions through a path of a length proportional to the value of a measurable condition, a pivoted bracket, a rotatable disc mounted on said bracket, a brake normally applied to the periphery of said disc, a second rotatable disc on said bracket and connected to said first disc, driving means operating in synchronism with said moving means to bring the periphery of said second mentioned disc into engagement with the curved driving edge of said element periodically during movement of said element in one direction through said path, said driving means simultaneously releasing said brake, whereby said driving edge may rotate said discs, and means to operate a counter from the rotation of said discs.

4. In a measuring instrument, the combination of a counter operating shaft to be driven, a rotatable driving disc operatively connected to said shaft, a rocking support for said disc, which support is biased in one direction, a brake disc coaxial with and connected to said driving disc, a pivoted brake lever adapted to engage the periphery of said brake disc and move said support against its bias, an oscillating element adapted to engage the periphery of said driving disc to drive the same, means to oscillate said element through a path of a length proportional to the value of a condition, means to move said brake lever through a path, and means to operate and synchronize said two moving means to bring said driving disc into engagement with said element during one direction of travel of the latter and to move said support against its bias at other times.

COLEMAN B. MOORE.